Patented Jan. 6, 1925.

1,521,859

UNITED STATES PATENT OFFICE.

FRANK J. BOHAN, OF ROCHESTER, NEW YORK, ASSIGNOR TO EASTMAN KODAK COMPANY, OF ROCHESTER, NEW YORK, A CORPORATION OF NEW YORK.

NITROCELLULOSE COMPOSITION.

No Drawing. Application filed March 22, 1923. Serial No. 626,809.

*To all whom it may concern:*

Be it known that I, FRANK J. BOHAN, a citizen of the United States of America, residing at Rochester, in the county of Monroe and State of New York, have invented certain new and useful Improvements in Nitrocellulose Compositions, of which the following is a full, clear, and exact specification.

This invention relates to nitrocellulose compositions. One object of the invention is to provide a relatively inexpensive composition from which transparent clear coatings may be easily prepared, even under adverse circumstances, which does not require to be heated to secure even evaporation and in which the relative proportions of the ingredients may be considerably varied without impairing the efficacy of the composition.

I have discovered that a nitrocellulose composition having the hereinabove recited properties can be prepared by mixing or compounding nitrocellulose with a solvent containing ethyl methyl ketone, ethyl alcohol and benzol. By way of example, I may prepare a varnish or lacquer by mixing 30% by weight of ethyl methyl ketone with 20% of ethyl alcohol and 50% of benzol. In this mixture I may dissolve 16 ounces of nitrocellulose to each gallon of the solvent. One of the features of my composition is the fact that these proportions may be widely varied, especially as the prices of the different ingredients vary. The cheaper ingredients can be considerably increased when necessary without impairing the usefulness of the product. This is due to the fact that the ethyl methyl ketone, ethyl alcohol and benzol have very nearly the same boiling points and, therefore, evaporate at almost the same rates, being less than $2\frac{1}{2}°$ C. apart in boiling point. The composition evaporates evenly and without "blooming", or forming opaque coatings, even when the proportions are considerably varied.

Because the vapor tensions of the ingredients are very nearly the same, it is not necessary to raise the temperature above normal room temperature in order to secure an even evaporation at the proper rate. Of course, heating can be used if desired, but it is easier to recover the solvent vapors at the lower vapor tensions corresponding to the normal temperatures.

My composition does not under ordinary room conditions tend to absorb water in sufficient degree to become hygroscopic and give whitish films.

Having thus described my invention, what I claim as new and desire to secure by Letters Patent is:

1. A composition of matter comprising nitrocellulose dissolved in a mixture of 30 parts of ethyl methyl ketone, 20 parts of ethyl alcohol and 50 parts by weight of benzol.

2. A composition of matter comprising nitrocellulose dissolved in a mixture of ethyl methyl ketone, ethyl alcohol and benzol, the proportion by weight of each ingredient of the mixture being at least 20% of the weight of said mixture.

Signed at Rochester, New York this 19th day of March 1923.

FRANK J. BOHAN.